United States Patent [19]

Matsushita et al.

[11] Patent Number: 4,525,428

[45] Date of Patent: Jun. 25, 1985

[54] PROCESS FOR PRODUCING MULTICOLOR HEAT-TRANSFER RECORDING PAPER

[75] Inventors: Toshihiko Matsushita, Funabashi; Sadao Morishita, Ibaraki; Hideo Makishima, Takasago, all of Japan

[73] Assignee: Mitsubishi Paper Mills, Ltd., Tokyo, Japan

[21] Appl. No.: 573,349

[22] Filed: Jan. 24, 1984

[30] Foreign Application Priority Data

Jan. 25, 1983 [JP] Japan ................................ 58-10758
Jan. 25, 1983 [JP] Japan ................................ 58-10759

[51] Int. Cl.³ ................................ B32B 9/06

[52] U.S. Cl. ................................ 428/488.1; 427/153; 427/363; 427/365; 427/370; 428/315.5; 428/317.9; 428/537.5

[58] Field of Search ............... 427/153, 365, 363, 370; 428/913, 315.5, 317.9, 537.5, 488.1

[56] References Cited

U.S. PATENT DOCUMENTS

| | | | |
|---|---|---|---|
| 3,895,173 | 7/1975 | Adachi | 428/913 |
| 4,311,750 | 1/1982 | Kubo et al. | 428/913 |
| 4,328,977 | 5/1982 | Ozawa et al. | 428/913 |
| 4,363,664 | 12/1982 | Delaney | 427/153 |
| 4,444,833 | 4/1984 | Moriguchi et al. | 427/153 |

FOREIGN PATENT DOCUMENTS

| | | |
|---|---|---|
| 57-182488 | 11/1982 | Japan . |
| 57-182489 | 11/1982 | Japan . |
| 57-182490 | 11/1982 | Japan . |
| 57-187296 | 11/1982 | Japan . |

*Primary Examiner*—Michael R. Lusignan
*Assistant Examiner*—Janyce A. Bell
*Attorney, Agent, or Firm*—Cushman, Darby & Cushman

[57] ABSTRACT

A process for producing a multicolor heat transfer recording paper using hot-melt inks with different melting points is provided. With the recording paper obtained according to this process, it is possible to form high-density and clear multicolor transfer images by merely controlling the temperature of the thermal head in a thermal facsimile or other similar devices.

10 Claims, No Drawings

PROCESS FOR PRODUCING MULTICOLOR HEAT-TRANSFER RECORDING PAPER

BACKGROUND OF THE INVENTION

1. Field of the Invention

This invention relates to a production process for a multicolor heat transfer recording paper, more particularly to a process for producing a multicolor heat transfer recording paper by using hot-melt inks having different melting points.

2. Description of the Prior Art

In the art of thermo-sensitive recording using thermal recording devices such as thermal printer or thermal facsimile, the so-called heat transfer recording system which has many advantageous features such as good keeping quality, indelibility and solvent resistance of the records has been developed and reached the stage of practical use. According to this system, a specific heat transfer recording paper having a hot-melt ink layer on a support is used, and in recording, a plain paper is placed on the ink layer side of said recording paper so that the ink is transferred from the heat transfer recording paper to the plain paper with the aid of heat from the thermal head of a thermal recording device such as thermal facsimile.

Monocolor (such as black-color) heat transfer recording by this system has already been applied to commercial use, and now the studies are directed to the realization of multicolor heat transfer recording by this system. Some remakable achievements have been disclosed in the official patent gazettes and other publications. For instance, Japanese Patent Laid-Open No. 182488/82 discloses a multicolor heat transfer recording paper having the ink layers of three basic colors of red, blue and yellow with a black ink layer provided for every trio of said basic color ink layers, said ink layers being formed on the principal surface of a base paper. In Japanese Patent Laid-Open No. 182489/82 is proposed a heat transfer recording paper having the groups of ink layers of different colors, the respective layers in each groups being varied in their area of occupancy in proportion to the frequency of use. Further, Japanese Patent Laid-Open No. 182490/82 reveals a heat transfer recording paper in which the ink layers of different colors are arranged in the sub-scanning direction.

According to these prior art devices, however, the transfer recording necessitates proper positioning of the recording paper in correspondence to the color to be transferred. This not only complicates the mechanisms of the recording system and the carrying and driving system of the apparatus but also makes it difficult to adapt the device to the speed-up of recording operation.

As an improvement over said prior art devices, Japanese Patent Laid-Open No. 187296/82 proposes a heat transfer recording paper in which a transfer layer containing the ink capsules of at least three primary colors (red, blue and yellow) is formed on the principal surface of base paper, said capsules of the respective colors being varied in melting point from each other. The patent states that, with this device, it is possible to obtain the transfer images of desired colors by merely controlling the temperature of the thermal head, and the apparatus can be simplified.

This device, however, has the drawbacks that the microcapsules containing hot-melt inks are hardly broken at their-walls even under application of a high voltage, and the transferred image are also unsatisfactory in their color development.

SUMMARY OF THE INVENTION

The object of this invention is to provide a process for producing a multicolor heat transfer recording paper which is improved over said defects of the prior art techniques, especially those disclosed in Japanese Patent Laid-Open No. 187296/82.

As a result of addiduous studies for attaining said object, the present inventors found that, by emulsionizing, mixing and dispersing three hot-melt inks of three primary colors, magenta, cyan and yellow, which are different in melting point from each other, and coating the dispersion on a support and drying the same, there can be obtained a multicolor heat transfer recording paper with which it is possible to form the high-density and clear multicolor transfer images by merely controlling the temperature of the thermal head.

The present inventors further found that, by forming three microcapsules each containing one of said hot-melt inks of three colors, coating the mixed microcapsules on a support, drying the same and then applying pressure for breaking said microcapsules, it is possible to obtain a multicolor heat transfer recording paper with which the high-density and clear multicolor transfer images can be formed by merely controlling the temperature of the thermal head.

Thus, the present invention provides a process for producing a multicolor heat transfer recording paper characterized by emulsionizing, mixing and dispersing three hot-melt inks of three primary colors, or magenta, cyan and yellow, which are different in melting point from each other, coating the dispersion on a support and drying the coating. (This invention is hereinafter referred to as the first invention).

The present invention also provides a process for procuding a multicolor heat transfer recording paper characterized by forming three microcapsules each containing one of three hot-melt inks of three primary colors, or magenta, cyan and yellow, which are different in melting point from each other, coating the mixed microcapsules on a support, drying the same, and then applying pressure for breaking said microcapsules. (This invention is hereinafter referred to as the second invention).

DETAILED DESCRIPTION OF THE INVENTION

According to the first invention, the inks of three primary colors (magenta, cyan and yellow) can exist randomly on a support as the independent emulsified particles, so that they can be easily transferred onto any plain paper by the operation of thermal head. Also, the emulsified particles of the respective inks are transferred to a plain paper as fine dots severally because of the difference in melting point of the respective inks, so that the clear transfer images can be obtained.

A further advantage of this invention is that in case the ink emulsions are of an aqueous system, it is possible to easily make plenty of multicolor heat transfer recording paper with a single run of coating of the ink emulsions in the form of an aqueous dispersion.

In the first invention, the emulsified particles of inks formed by emulsionizing the respective hot-melt inks of magenta, cyan and yellow, differing in melting point from each other, are coated randomly on a support. Suppose here that the melting point of the respective inks is higher in the order of magenta, cyan and yellow. When it is desired to use a multicolor picture original and transfer a magenta portion on the multicolor picture, the magenta recording signal in the picture signal is controlled in heating to the temperature of the low melting point of the magenta ink by the thermal head and the emulsified particles of magenta ink on the coated surface of the heat transfer recording paper can be easily transferred onto a plain paper. The cyan and yellow inks can be transferred likewise according to the difference of melting point. In this case, the emulsified particles of inks of said three primary colors stay scattered randomly in the coating layer and, when transferred onto a plain paper, they are expressed as dots.

In the hot-melt inks of the three primary colors (magenta, cyan and yellow) used in the first invention, the difference in melting point of these inks is usually at least 10° C., preferably greater than 20° C.

Next, the second invention will be described in detail.

According to the second invention, the microcapsules of hot-melt inks are coated on a support and a pressure is applied to the microcapsule coating. This can improve the flatness of the hot-melt ink layer surface to better adhesion to a plain paper.

Also, in this second invention, since the walls of the microcapsules in the ink layer are broken, though the respective capsules of three primary colors stay separate from each other, the inks can be easily transferred to a plain paper surface by the thermal head. Further, as the separate microcapsules are transferred as fine dots on the plain paper surface owing to the difference in melting point of the respective inks, a clear transfer image can be obtained.

Moreover, in case the microcapsules are prepared as an aqueous dispersion, a large number of multicolor heat transfer recording paper can be produced easily by one run of coating of the microcapsules in the form of an aqueous dispersion.

According to the second invention, the microcapsules containing respectively the magenta, cyan and yellow hot-melt inks differing in melting point from each other are coated randomly on the support. Let it be supposed here that the inks of the respective colors were so prepared that their melting point is higher in the order of magenta, cyan and yellow. When it is desired to use a multicolor picture original and transfer, for example, a magenta portion on the multicolor picture, the magenta recording signal in the picture signal is controlled in heating to the temperature of the low melting point of magenta ink by the thermal head and the broken microcapsules of magenta ink on the coating surface of the heat transfer recording paper can be easily transferred to a plain paper surface. The cyan and yellow microcapsules can be transferred likewise according to the difference of melting point. In this case, the microcapsules of inks of three primary colors stay scattered randomly on the coating layer surface and, when transferred onto a plain paper, they are expressed as fine dots.

In the hot-melt inks according to the second invention, the difference in melting point of the inks of the respective colors (magenta, cyan and yellow) is usually be at least 10° C., preferably greater than 20° C.

The component materials of the multicolor heat transfer recording paper according to the present invention (first and second inventions) will be discussed below.

The support used in the present invention is preferably a thin sheet-like substance for the reason of transfer characteristic, and in this sence, it is recommended to use a paper such as condenser paper or glassine paper or a film made of a resin such as polyester, polyimide, polycarbonate or Teflon with a thickness of 10 to 30 μm.

The hot-melt inks are principally composed of a coloring matter, a wax, a low-melting resin and a softener which are sufficiently dispersed and mixed. As the wax, there can be used paraffin wax, microcrystalline wax, beeswax, whale wax, shellac wax, carnauba wax, candelilla wax, montan wax, low-molecular weight polyethylene wax and the like.

As the low-melting resin, one may use, for example, ethylene-vinyl acetate copolymer, ethyleneacrylate copolymer, butadiene-styrene copolymer, vinyl acetate-vinyl chloride copolymer, polyvinyl acetate, rosin or its derivatives, petroleum resin and the like.

As the coloring matter, a commonly used inorganic or organic pigment or dye may be used for each of magenta, cyan and yellow inks.

As the softener, there may be used, for example, oleic acid, castor oil, dioctyl phthalate, liquid paraffin, mineral oils and the like.

The microcapsules containing the hot-melt inks used in the second invention can be produced by a method known in the art, for example, complex coacervation method, interfacial polymerization method, in situ polymerization method and spray drying method.

As the method for producing the multicolor heat-transfer recording paper of the present invention (first and second inventions), there may be employed, for example, a method in which the aqueous dispersion is coated on the whole surface of a support by using an ordinary coater such as air knife coater, or a method in which the dry microcapsules are dispersed in an organic solvent and the dispersion is coated on the whole or a part of the surface of a support by using a suitable printing machine such as a flexographic printing machine or gravue printing machine.

In the second invention, the coated paper need be further pressed, and such pressing can be accomplished by a known means such as supercalendering or machine calendering.

Further, in addition to the emulsified particles of the magenta, cyan and yellow hot-melt inks in the first invention or the microcapsules containing the magenta, cyan and yellow hot-melt inks in the second invention, it is possible to properly add the microcapsules containing an ink of black or other color.

The present invention will be described in further detail hereinbelow by way of the examples thereof. In the following descriptions of the Examples, all the "parts" are by weight unless otherwise noted.

EXAMPLE 1

(Embodying the first invention)

(1) The magenta, cyan and yellow ink compositions were as follows.

| Color | Melting point | Materials | Amount (parts) |
|---|---|---|---|
| Magenta | 50° C. | Magenta pigment | 10 |
| | | Paraffin wax (m.p. 50° C.) | 80 |
| | | Castor oil | 5 |
| | | Petrosin (petroleum resin) | 5 |

-continued

| Color | Melting point | Materials | Amount (parts) |
|---|---|---|---|
| Cyan | 65° C. | Cyan pigment | 10 |
| | | Paraffin wax (m.p. 66° C.) | 80 |
| | | Castor oil | 5 |
| | | Petrosin | 5 |
| Yellow | 80° C. | Yellow pigment | 10 |
| | | Carnauba wax (m.p. 80° C.) | 80 |
| | | Castor oil | 5 |
| | | Petrosin | 5 |

The above-shown materials for each ink composition were melted and mixed into a homogeneous composition to prepare a hot-melt ink.

(2) Each of the magenta, cyan and yellow ink emulsions was prepared from the following composition:

| | |
|---|---|
| Hot-melt ink | 30 parts |
| Nonionic surfactant | 2 parts |
| Water | 68 parts |

Preparation of the magenta ink emulsion having a melting point of 50° C. is described in detail below.

First, 2 parts of a nonionic surfactant was fed into a container containing 68 parts of water and dispersed well. The liquid temperatue was maintained at 60° C., higher than the melting point (50° C.) of the ink. Then the already molten magenta ink was added gradually into the surfactant-dispersed water under stirring. The stirring speed was increased, and when the emulsified particles came to have a uniform size of about 5 μm, the liquid temperature was lowered down to room temperature to complete the emulsionization of the magenta ink.

The cyan and yellow ink emulsions were prepared in the similar way except that the liquid temperature was maintained at 75° C. for cyan and 90° C. for yellow.

(3) The multicolor heat transfer recording paper was made in the following way.

A 30% aqueous dispersion composed of 30 parts (solids) each of the magenta, cyan and yellow hot-melt ink emulsions prepared in (2) above and 6 parts of a microcrystalline wax emulsion was coated on a 26 $g/m^2$ thin glassine paper to a dry coating weight of about 5 $g/m^2$ by using Meyer's bar. The resulting coated paper was supercalendered under a pressure of 5 $kg/cm^2$ to give desired flatness to the coated paper, whereby the objective multicolor heat transfer recording paper could be obtained.

The coated side of this multicolor heat transfer recording paper was placed on a plain paper and printing was conducted with impression energies corresponding to the melting points of the magenta, cyan and yellow inks by using a facsimile tester made by Matsushita Electronic Parts Mfg. Co. As a result, clear multicolor heat transfer recording could be made as dots of respective colors on the plain paper surface.

EXAMPLE 2

(embodying the second invention)

(1) The microcapsules containing magenta hot-melt ink were produced in the following way.

(a) Magenta ink composition having a melting point of 50° C.:

| | |
|---|---|
| Magenta pigment | 10 parts |
| Paraffin wax (m.p. 50° C.) | 80 parts |
| Castor oil | 5 parts |
| Petrosin (petroleum resin) | 5 parts |

The above materials were melted and mixed homogeneously to prepare a magenta hot-melt ink.

(b) Microcapsulation 80 parts of magenta ink prepared in the manner described in (a) above and melted at 60° C. was dispersed in 100 parts of a 5% aqueous solution (pH 4.0) in which a styrene-maleic anhydride copolymer heated to 60° C. was dissolved with a small quantity of sodium hydroxide, and the dispersion was emulsified until the emulsified particles came to have a size of about 4 to 5 microns.

In the meantime, 10 parts of melamine, 25 parts of a 37% formaldehyde solution, 65 parts of water and a small quantity of sodium hydroxide were mixed and heated to 60° C. This solution became transparent in 15 minutes and a melamine-formalin precondensate was obtained. This precondensate was added to the emulsified solution and stirred continuously for 3 hours while maintaining the liquid temperature at 60° C. to complete the microcapsulation. The obtained microcapsules had an average particle size of 5 to 6 μm and the solids content of the microcapsule dispersion was about 45%.

(2) The microcapsules containing cyan hot-melt ink were produced in the following way.

(a) Cyan ink composition with m.p. 65° C.:

| | |
|---|---|
| Cyan pigment | 10 parts |
| Paraffin wax (m.p. 66° C.) | 80 parts |
| Castor oil | 5 parts |
| Petrosin | 5 parts |

The above materials were melted and mixed into a homogeneous composition to prepare a cyan hot-melt ink.

(b) Microcapsulation

Microcapsulation was accomplished in the same way as described in (1)-(b) above, except that the temperature in the operation was kept at 75° C. and the time for the capsulation was 2.5 hours.

(3) The microcapsules containing yellow hot-melt ink were produced in the following way.

(a) Yellow ink composition with m.p. 80° C.:

| | |
|---|---|
| Yellow pigment | 10 parts |
| Carnauba wax (m.p. 80° C.) | 80 parts |
| Castor oil | 5 parts |
| Petrosin | 5 parts |

The above materials were melted and mixed into a homogeneous composition to prepare a yellow hot-melt ink.

(b) Microcapsulation was performed in the same way as described in (1)-(b) above but by raising the operation temperature to 90° C. and using 2 hours for the capsulation.

(4) The multicolor heat transfer recording paper was made in the following way.

A 30% aqueous dispersion composed of 30 parts (solids) each of the microcapsules containing magenta, cyan and yellow hot-melt inks obtained in the manner described in (1)-(3) above and 10 parts of a microcrystalline wax emulsion was coated on a 26 $g/m^2$ thin glassine paper to a dry coating weight of about 5 $g/m^2$ by using Meyer's bar. The resulting coated paper was supercalendered under a pressure of 10 $kg/cm^2$ to break the microcapsules in the coating layer while giving desired flatness to the coated paper, thereby making the objective multicolor heat transfer recording paper.

The coated side of this multicolor heat transfer recording paper was placed on a plain paper and printing was conducted with impression energies corresponding to the melting points of the magenta, cyan and yellow inks by using a facsimile testing machine made by Matsushita Electronic Parts Mfg. Co. As a result, clear multicolor heat transfer recording could be achieved as dots of respective colors on the plain paper surface.

COMPARATIVE EXAMPLE

By using a coated paper same as prepared in the preceding Example but not subjected to supercalendering so that the microcapsules remained unbroken, printing was carried out similarly with the Matsushita's facsimile testing machine. As a result, the walls of the microcapsules containing the inks were not broken under the applied energies and no transfer occured.

What is claimed is:

1. A process for producing a multicolor heat transfer recording paper, which comprises emulsionizing three hot-melt inks of three primary colors, magenta, cyan and yellow, said inks differing by at least 10° C. in melting point from each other, mixing and dispersing the emulsions, then coating the dispersion on a support and drying the coating.

2. The process according to claim 1 wherein the difference in melting point of the inks of the respective colors is greater than 20° C.

3. The process according to claim 1 wherein the support has a thickness of 10 to 30 μm.

4. The process according to claim 1 wherein the hot-melt inks are principally composed of a coloring matter, a wax, a low-melting resin and a softener.

5. A process for producing a multicolor heat transfer recording paper, which comprises mixing three microcapsules each containing one of three hot-melt inks of three primary colors, magenta, cyan and yellow, said inks differing by at least 10° C. in melting point from each other, coating the mixed microcapsules on a support and then pressing them to break the microcapsules.

6. The process according to claim 5 wherein the difference in melting point of the inks of the respective colors is greater than 20° C.

7. The process according to claim 5 wherein the support has a thickness of 10 to 30 μm.

8. The process according to claim 5 wherein the hot-melt inks are principally composed of a coloring matter, a wax, a low-melting resin and a softener.

9. A multicolor heat transfer recording paper produced by the process of claim 1.

10. A multicolor heat transfer recording paper produced by the process of claim 5.

* * * * *